United States Patent

McGrath

[15] 3,694,932

[45] Oct. 3, 1972

[54] MATHEMATICS TEACHING MACHINE FOR PRIMARY GRADES

[72] Inventor: Mildred G. McGrath, Chicago, Ill. 60615

[73] Assignee: McGrath-Hoffman and Associates

[22] Filed: June 1, 1971

[21] Appl. No.: 148,720

[52] U.S. Cl. .................................. 35/31 B, 46/1 A
[51] Int. Cl. ............................................. G09b 19/02
[58] Field of Search........35/31 R, 31 B, 31 D; 46/1 A

[56] References Cited

UNITED STATES PATENTS

| | | | |
|---|---|---|---|
| 1,421,656 | 7/1922 | Abele | 46/1 A |
| 1,803,265 | 4/1931 | Mallard | 46/1 A |
| 2,695,462 | 11/1954 | Gilbert | 35/31 D |
| 3,131,488 | 5/1964 | Slater | 35/31 D |

*Primary Examiner*—Wm. H. Grieb
*Attorney*—Dressler, Goldsmith, Clement & Gordon

[57] ABSTRACT

A teaching device for teaching mathematics in the primary grades including a board having a plurality of openings extending between opposite sides with a movable plug in each of the openings. Each plug has a cardinal number on opposite ends thereof and is axially movable between first and second positions, the same number being on both ends of a given plug. In a device for teaching addition and subtraction, the numbers on the plugs are preferably arranged to form a number line that extends consecutively from one side of the device to the other. A chart for each of the plugs is provided on one surface of the board, with the chart having a plurality of groups of numerical values each having a mathematical solution equal to the cardinal number of the associated plug, so that a person facing one surface of the board may perform a problem solving function and a person facing the other surface of the board can perform an answer checking function.

7 Claims, 4 Drawing Figures

PATENTED OCT 3 1972 3,694,932
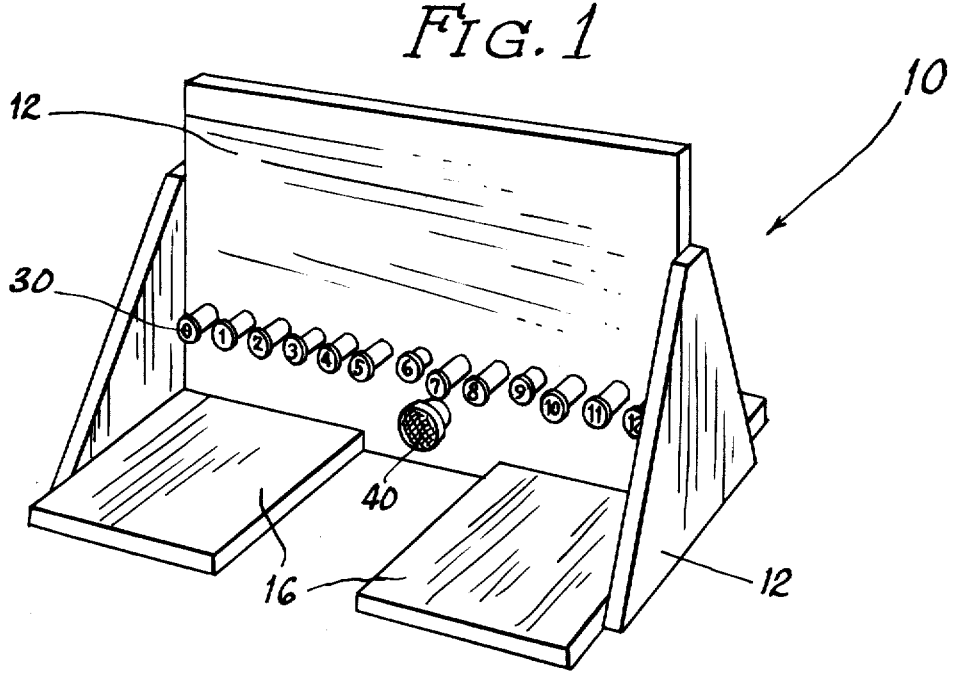
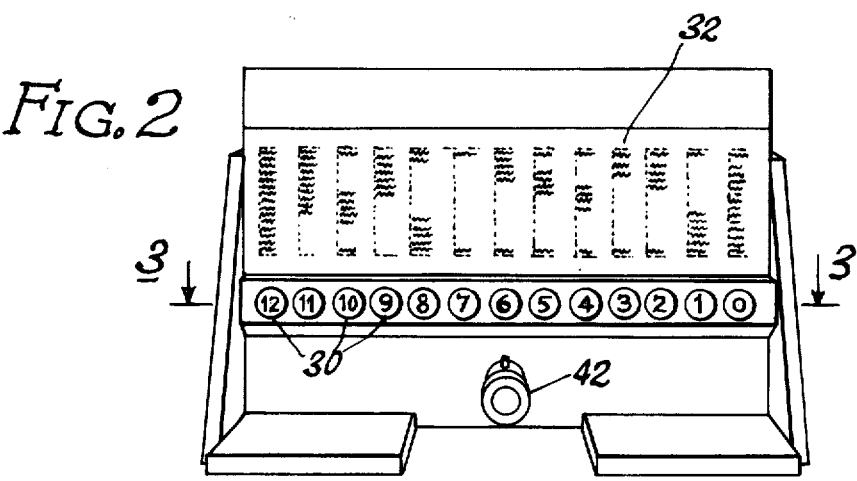
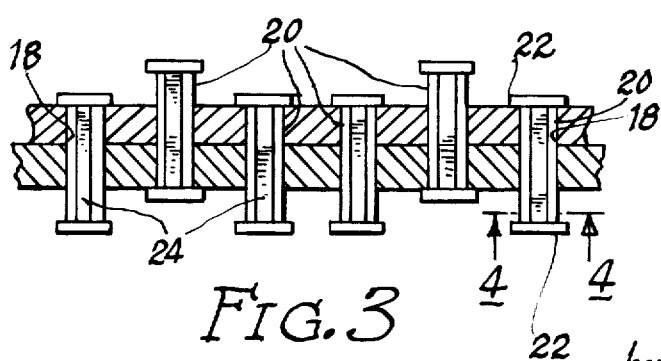
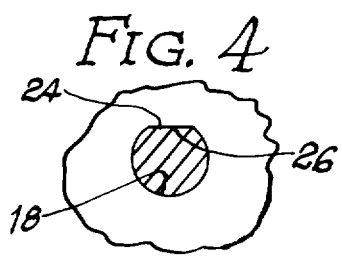
INVENTOR
Mildred G. McGrath
by Dressler, Goldsmith,
Clement & Gordon  Att'ys

MATHEMATICS TEACHING MACHINE FOR PRIMARY GRADES

BACKGROUND OF THE INVENTION

The present invention relates generally to teaching devices, and more particularly to an improved device for teaching mathematics, such as addition and subtraction, in the primary grades.

In recent years, numerous devices have been developed for teaching children in the early elementary grades the basic processes of addition, subtraction, multiplication and division of numbers. Most of the devices heretofore known require too much adult supervision. Many of the known devices are quite expensive, thereby limiting the number available for any given classroom. In addition, several of the present day available devices are extremely complicated while others are mechanical in nature, with a number of relatively movable parts, thereby adding to the noise pollution in a classroom.

There are numerous other simpler and less expensive forms of educational apparatus for teaching elementary addition that include a number of individual parts that are manipulated to determine solutions to mathematical problems. One such device is disclosed in U.S. Pat. No. 3,131,488 issued on May 5, 1964. While this device is rather inexpensive to construct, there are many loose parts that form part of the teaching apparatus, which can easily be lost or misplaced.

Various other devices have been commercialized that incorporate mechanical means to determine the answer to a mathematical problem, but in many of these devices the answer to the problem is so easily solved by mechanical means that the child is not required to think.

Thus there remains a need for a simple and inexpensive educational device that can easily be manufactured and can readily be utilized by children in the lower elementary grades.

SUMMARY OF THE INVENTION

The present invention contemplates a teaching device that can be utilized by two children, both of whom will develop a sense of satisfaction in solving mathematical problems. Alternatively, but with somewhat less effective results, a single child can set up his own mathematical problems and can independently seek a solution and check the solution for correctness.

The teaching device of the present invention consists of a board or vertical partition that has two opposed surfaces. The board has a plurality of openings extending therethrough from one surface of the board to the other, with a plug axially shiftable between two positions in each of the openings. Each of the plugs has a common cardinal number on opposite ends and the numbers are visible by persons stationed facing the opposed surfaces of the partition or board. One surface of the partition or board, which may be termed the "computer side" of the device, additionally carries a plurality of charts equal in number to the number of plugs, with a plurality of groups of numerical values on each chart that all have a mathematical solution equal to the cardinal number of the associated plug.

In addition, the device has an indicator light or other suitable device mounted on the other surface, which may be termed the "operator side" of the board, that is capable of being energized by an individual on the "computer side" of the board.

The teaching device allows one child to be located on the "computer side" of the board to give a mathematical problem from one of the charts to a second child on the "operator side" of the board. The second child finds a mathematical solution to the problem proposed, and axially shifts the appropriate plug having the cardinal number corresponding to the solution selected. The first child can then perform an answer checking function by checking the chart corresponding to the plug that was moved by the second child to determine the correct answer to the problem from the chart. If the answer of the "operator child" is correct, the first child can energize the indicator means to show a correct response, which brings an immediate reward to the problem solving child.

BRIEF DESCRIPTION OF DRAWINGS

FIG. 1 is a perspective view of the teaching device of the present invention;

FIG. 2 is an elevation view of the computer side of the device;

FIG. 3 is a fragmentary horizontal section taken generally along line 3—3 of FIG. 2; and FIG. 4 is a fragmentary section taken generally along line 4—4 of FIG. 3.

DETAILED DESCRIPTION

While this invention is susceptible of embodiment in many different forms, there are shown in the drawings and will herein be described in detail one specific embodiment, with the understanding that the present disclosure is to be considered an exemplification of the principles of the invention and is not intended to limit the invention to the embodiment illustrated.

A teaching device of the present invention, designated by the reference numeral 10, is disclosed in perspective view in FIG. 1. The device includes a vertical partition or board 12 that has suitable support members 14 and 16 secured to opposite sides and edges so that the board can readily be maintained in a vertical position on a flat surface, such as a table. The board or member 12 has a plurality of openings 18 located therein, with the openings extending between opposed surfaces of the board.

Each of the openings 18 receives a plug 20 having an enlarged portion 22 defining opposite ends of the plug. As more clearly shown in FIG. 3, the plugs are axially shiftable between first and second positions, which are defined by the enlarged portions 22 engaging the opposed surface of the board. In FIGS. 1 and 3, two of the plugs are shown in the second position while the remaining plugs are shown in the first position.

In order to position the plugs properly in the openings, it is preferable that some cooperating means be provided to limit the movement of the plugs to axial movement in the opening, and to avoid axial rotation thereof. In the illustrated embodiment, this is shown as a flattened portion 24 in each plug 20 extending axially of the circular plug, and a cooperating flattened portion 26 in the opening 18. However, numerous other anti-rotation means may be used. For example, the plugs and openings could both be square in cross-section.

Each of the plugs has a cardinal number, indicated by the reference numeral 30, on each of its ends, with common cardinal numbers being located on opposite ends of the respective plugs, In the illustrated embodiment, thirteen such plugs are illustrated and the cardinal numbers 0 thru 12 appear in serial order on each side of the board. An inspection of FIGS. 1 and 2 shows that the numbers define a "number line" on each side of the board, appearing from left to right as viewed from the "operator side" of the device and in the reverse order, or from right to left, on the "computer side" of the device.

A chart 32 is secured to the surface of the board on the "computer side" for each of the 13 buttons or plugs. Each chart has a plurality of groups of numerical values, each having a mathematical solution that is equal to the cardinal number on the associated plug. For example, the following charts could appear directly above the respective plugs having the indicated cardinal numbers thereon:

| 12 | 11 | 10 | 9 | 8 |
|---|---|---|---|---|
| 0+12 | 0+11 | 0+10 | 0+9 | 0+8 |
| 1+11 | 1+10 | 1+9 | 1+8 | 1+7 etc. |
| 2+10 | 2+9 | 2+8 | 2+7 | |
| 3+9 | 3+8 | 3+7 | 3+6 | |
| 4+8 | 4+7 | 4+6 | 4+5 | |
| 5+7 | 5+6 | 5+5 | 5+4 | |
| 6+6 | 6+5 | 6+4 | 6+3 | |
| 7+5 | 7+4 | 7+3 | 7+2 | |
| 8+4 | 8+3 | 8+2 | 8+1 | |
| 9+3 | 9+2 | 9+1 | 9+0 | |
| 10+2 | 10+1 | 10+0 | 9—0 | |
| 11+1 | 11+0 | 10—0 | 10—1 | |
| 12+0 | 11—0 | 11—1 | 11—2 | |
| 12—0 | 12—1 | 12—2 | 12—3 | |

The device further has indicator means 40 on the "operator side" of the partition that may be energized by a switch or energizing means 42 located on the "computer side" of the device. In the illustrated embodiment, the indicator means and actuator are in the form of a conventional switch button-operated flashlight.

The operation of the device is believed to be apparent from the above description, but will briefly be summarized at this point. Assuming that two children are operating the device and are located on opposite sides of partition 12, the child standing on the "computer side" reads off a problem that may involve addition or subtraction to the child on the "operator side" of the partition, and waits to see whether the child performing the problem solving function can work out the correct solution. The child performing the problem solving function, if just beginning to learn addition and subtraction, can push the plug having the cardinal number corresponding to the first number given for the problem, and then count in the appropriate direction on the number line, for either addition or subtraction from this plug, a number of plugs equal to the second number given, in order to determine the solution or correct answer.

When the child on the "operator side" reaches the plug having the cardinal number corresponding to what he believes to be the answer, he pushes this button to move it from the first to the second position and the two plugs will extend beyond the ends of the remaining plugs on the "computer side" of the machine. To check whether the answer is correct, the "computer child" can then look at the chart located above the answer plug that was moved to the second position, to determine whether the answer to the problem given by the "operator child" is the answer that appears on the chart. If so, the "computer child" manually actuates the light source 40 through switch 42 to indicate to the "operator child" that the proposed solution is the correct answer to the given problem.

As can be appreciated from the above description, the device is extremely simple and inexpensive to construct, has no loose parts to be lost or misplaced, and has numerous advantages in teaching.

With two children operating the mathematical device, the addition and subtraction facts are impressed not only upon the "operator child" but also upon the "computer child" who follows the mathematical chart, thus reinforcing the learning of both children.

The use of the "number line" readily develops the ability of the children to comprehend the various numbers rapidly and accurately, since they are arranged in sequential order along the "number line." In addition, the "computer child" rapidly comprehends the mathematical pattern that is evident on each of the charts located on his side of the device. The combined result of these advantages if to develop very effectively the mathematical sense of the two children.

In the operation of the device by two children, a team spirit or spirit of helpfulness can be developed, since the "computer child" can help the "operator child" achieve success. Thus, he can help by jotting down the problems missed by the "operator child," and attempt to help him in learning the proper solutions. With two such devices in use, children could be divided into teams, with scorekeepers recording the respective scores of the teams.

The device can also be utilized by a single child working independently, since he can develop his own problems while located on one side of the board, work out the solution to the problem, and push the plug with the appropriate cardinal number as the solution. He can then check the computer chart corresponding with the selected plug to determine whether there is a problem such as he has proposed on the chart, and whether his answer is correct.

In both uses, the device needs no teacher monitoring after initial instructions have been given, and several such devices can be simultaneously operated by a group of children without interrupting each other. In addition, the teacher will be freed to help other children who are not at the moment using this teaching device.

Each individual child can enjoy his own successes, or correct his own mistakes and succeed on the next try. This will help foster in the child the important learning factors of favorable self-image and sense of individual strength.

If desired, a more complicated mathematical table could be devised (to include multiplication and division, for example) for the charts on the "computer side" of this teaching device.

The above detailed description is given for clearness of understanding only. No unnecessary limitations should be understood therefrom, as modifications will be obvious to those skilled in the art.

What is claimed is:

1. A teaching device for the teaching of mathematics, such as addition and subtraction, in the primary grades, comprising: a board having two opposed surfaces, with a plurality of spaced openings extending between said surfaces; a plug in each of said openings, said plugs having opposite ends extending beyond said surfaces and being axially movable between first and second positions in said openings; a cardinal number on each end of each plug with common cardinal numbers on opposite ends of the respective plugs; and a chart for each of said plugs, each chqrt having a plurality of groups of numerical values each having a mathematical solution equal to the cardinal numbers of the associated plug, said charts being hidden from the view of a person stationed facing one surface of said board to perform a problem solving function, but visible to a second person stationed facing the other surface of said board to perform an answer checking function.

2. A teaching device as defined in claim 1, in which said cardinal numbers are serially arranged to form a number line observable by persons facing the respective surfaces of said board, with the number line extending from one side of the device to the other in opposite directions depending upon which surface of the device is being observed.

3. A teaching device as defined in claim 1, in which said board extends vertically and said plugs are located in a common horizontal plane.

4. A teaching device as defined in claim 1, further including indicator means visible to said person facing said one surface of said board, and energizing means for said indicator means accessible to said second person who performs the answer checking function.

5. A teaching device as defined in claim 1, in which said plugs each have enlarged portions on opposite ends that have a dimension greater than the size of the opening in which the plug is supported, said enlarged portions being adapted to engage said opposed surfaces of said board to define the respective positions for the plugs.

6. A teaching device as defined in claim 5, further including cooperating means between said plugs and said board for preventing axial rotation of said plugs in the openings.

7. A teaching device comprising a board having opposite surfaces; support means for holding said board in a substantially vertical position; means defining a plurality of horizontally spaced openings of substantially uniform size extending through said board, said openings having axes located in a substantially horizontal plane; a plug axially shiftable in each opening and having enlarged portions on opposite ends located beyond said opposite surfaces of said board, said plugs being axially movable between first and second positions defined by the enlarged portions engaging opposite sides of said board; a cardinal number on each end of each plug with common numbers on opposite ends of a given plug; a chart mounted on one surface of said board above each of said plugs, each chart having a plurality of groups of numerical valves having a mathematical solution corresponding to the cardinal number on the associated plug; indicator means mounted on the opposite surface of said board; and energizing means for said indicator means mounted on said one surface of said board, said energizing means being accessible to a person facing said one surface so that a child stationed facing said opposite surface of said board can perform a problem solving function and move the proper plug corresponding to the answer from said first to said second position, and a second child facing said one surface of said board can check the chart above said plug in the second position to perform an answer checking function and energize the indicator means to give an indication of a correct answer.

* * * * *